US006987156B2

(12) United States Patent
Arimoto et al.

(10) Patent No.: US 6,987,156 B2
(45) Date of Patent: Jan. 17, 2006

(54) FILM FOR FASTENING CARGO DURING TRANSPORTATION AND METHOD FOR FASTENING CARGO USING THE SAME

(75) Inventors: Masashi Arimoto, Sodegaura (JP); Tomohiko Kimura, Yamaguchi (JP); Saburou Takeyama, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 83 days.

(21) Appl. No.: 10/601,871

(22) Filed: Jun. 24, 2003

(65) Prior Publication Data

US 2004/0048085 A1 Mar. 11, 2004
US 2005/0118444 A9 Mar. 11, 2004

(30) Foreign Application Priority Data

Jun. 24, 2002 (JP) ...................................... 2002-182996

(51) Int. Cl.
*C08F 212/04* (2006.01)

(52) U.S. Cl. ....................... 526/347; 526/281; 526/308; 53/401; 53/484

(58) Field of Classification Search ................. 526/347, 526/281, 308; 53/401, 484
See application file for complete search history.

(56) References Cited

U.S. PATENT DOCUMENTS 6,148,591 A 11/2000 Ridgeway et al.
6,376,095 B1 * 4/2002 Cheung et al. ............. 428/516
2001/0012879 A1 8/2001 Arai et al.

FOREIGN PATENT DOCUMENTS

| | | | |
|---|---|---|---|
| CN | 1224031 A | | 7/1999 |
| EP | 0416815 | * | 3/1991 |
| WO | WO 98/10014 A1 | | 3/1998 |

* cited by examiner

*Primary Examiner*—Fred Teskin
(74) *Attorney, Agent, or Firm*—Buchanan Ingersoll PC

(57) ABSTRACT

A film and method for fastening cargo during transportation wherein the film has a percentage strain change 100 hours after applying a load of 3.5 MPa at a temperature of 23° C. of not more than 2.0%, and a percentage strain change 100 hours after applying a load of 0.5 MPa at a temperature of 55° C. of not more than 2.5%. Moreover, it is preferable for the elastic modulus at a temperature of 23° C. to be not more than 60 MPa, and the elastic modulus at a temperature of 55° C. to be not more than 20 MPa. Such a film can be formed from substantially random interpolymer(s) each comprising 1 to 99 mol % of polymer units derived from an aromatic vinyl or vinylidene monomer and/or a hindered aliphatic or cycloaliphatic vinyl or vinylidene monomer, and 1 to 99 mol % of polymer units derived from at least one $\alpha$-olefin having 2 to 20 carbon atoms. The above film has a low percentage strain change compared with films made of EVA or a urethane resin, and hence the ability to hold/fasten products during transportation is excellent, and thus the products can be prevented from being damaged.

7 Claims, No Drawings

FILM FOR FASTENING CARGO DURING TRANSPORTATION AND METHOD FOR FASTENING CARGO USING THE SAME

BACKGROUND OF THE INVENTION

1. Field of the Invention

The present invention relates to a film for fastening cargo during transportation, and more specifically to a protective film that has a low percentage strain change, and has excellent ability to hold/fasten products. The present invention also relates to a method for fastening cargo using the film.

2. Description of the Related Art

Fastening film is used for the purpose of holding/fastening products (cargo) during transportation with a method in which the products are fastened directly in corrugated cardboard, or a method in which the products are held in a midair state sandwiched between a pair of films. Because the purpose of fastening film is to hold/fasten products during transportation, the fastening film is required to have properties such that the products are not subjected to shock and are not damaged. Moreover, fastening film is used throughout the year over a broad temperature range, and the properties in a normal temperature range in which usage is common (around 23° C.) and in a high temperature range in which the film stretches easily (above 50° C.) are particularly important.

Fastening films used from hitherto include resin films made of EVA, urethane resins and so on.

With such a fastening film, the elastic modulus and the percentage strain change are high, with the elastic modulus exceeding 60 MPa and the percentage strain change exceeding 2.0% at 23° C., and the elastic modulus being at least 20 MPa and the percentage strain change being at least 2.5% at 55° C., and hence it is difficult to stabilize products with the fastening film not fitting to the products during transportation, and thus problems arise such as the products being damaged. There are thus calls for a film having a low percentage strain change at 23° C. and 55° C.

Amid this state of affairs, a film that uses a urethane resin and is used in a state of suspension in which a computer product or the like is sandwiched in midair has been proposed (U.S. Pat. No. 6,148,591). Moreover, a film of an ethylene-styrene random copolymer has also been proposed (WO 98/10014).

However, in these patent documents, there is no mention whatsoever of the percentage strain change at certain temperatures.

The advent of a film that has a low percentage strain change at certain temperatures, preferably has a low elastic modulus, and has excellent ability to hold/fasten products during transportation is thus desired.

SUMMARY OF THE INVENTION

It is an object of the present invention to resolve problems of the prior art as described above, and to provide a film for fastening cargo during transportation that has a low percentage strain change compared with films made of EVA or a urethane resin. A film for fastening cargo during transportation according to the present invention is characterized in that a percentage strain change 100 hours after applying a load of 3.5 MPa at a temperature of 23° C. is not more than 2.0%, and a percentage strain change 100 hours after applying a load of 0.5 MPa at a temperature of 55° C. is not more than 2.5%. It is preferable for the film for fastening cargo during transportation to have an elastic modulus of not more than 60 MPa at a temperature of 23° C., and an elastic modulus of not more than 20 MPa at a temperature of 55° C.

Specifically, such film preferably contains at least one substantially random interpolymer comprising:

(1) 1 to 99 mol % of polymer units derived from (a) at least one aromatic vinyl or vinylidene monomer, or (b) at least one hindered aliphatic or cycloaliphatic vinyl or vinylidene monomer, or (c) a combination of at least one aromatic vinyl or vinylidene monomer, and at least one hindered aliphatic or cycloaliphatic vinyl or vinylidene monomer, and (2) 1 to 99 mol % of polymer units derived from at least one α-olefin having 2 to 20 carbon atoms.

As such an interpolymer, it is preferable to use a substantially random interpolymer comprising 5 to 65 mol % of polymer units derived from at least one aromatic vinyl or vinylidene monomer, and 35 to 95 mol % of polymer units derived from at least one α-olefin having 2 to 20 carbon atoms, and it is particularly preferable to use a substantially random interpolymer comprising 5 to 65 mol % of polymer units derived from styrene, and 35 to 95 mol % of polymer units derived from at least one α-olefin having 2 to 10 carbon atoms.

Moreover, as such an interpolymer, it is preferable to use a pseudo-random interpolymer comprising 5 to 50 mol % of polymer units derived from at least one aromatic vinyl or vinylidene monomer, and 50 to 95 mol % of polymer units derived from at least one α-olefin having 2 to 20 carbon atoms, and it is particularly preferable to use a pseudo-random interpolymer comprising 5 to 50 mol % of polymer units derived from styrene, and 50 to 95 mol % of polymer units derived from at least one α-olefin having 2 to 10 carbon atoms.

Here, as disclosed in Japanese Patent Application Laid-open No. 7-070223, 'pseudo' in 'pseudo-random interpolymer' means that there are no homopolymer segments comprising a vinyl or vinylidene monomer in the interpolymer molecular structure. That is, in a pseudo-random interpolymer, insertion of a vinyl or vinylidene monomer from head to head or from head to tail does not occur.

Another object of the present invention is to provide a method for fastening cargo using the films described above.

DESCRIPTION OF THE PREFERRED EMBODIMENTS

Following is a concrete description of the film for fastening cargo during transportation according to the present invention.

As mentioned above, the film for fastening cargo during transportation according to the present invention contains at least one substantially random interpolymer.

Interpolymers

An interpolymer that can be used in the present invention is a substantially random interpolymer comprising (1) 1 to 99 mol % of polymer units derived from (a) at least one aromatic vinyl or vinylidene monomer, or (b) at least one hindered aliphatic or cycloaliphatic vinyl or vinylidene monomer, or (c) a combination of at least one aromatic vinyl or vinylidene monomer, and at least one hindered aliphatic or cycloaliphatic vinyl or vinylidene monomer, and (2) 1 to 99 mol % of polymer units derived from at least one α-olefin having 2 to 20 carbon atoms.

The term 'interpolymer' used here means a copolymer in the case of polymerizing at least two monomers to form an interpolymer.

'Copolymer' used here means a polymer in the case of polymerizing at least two monomers to form a copolymer.

'Substantially random' used here in the substantially random interpolymer comprising α-olefin(s), and aromatic vinyl monomer(s), aromatic vinylidene monomer(s), hindered aliphatic vinyl monomer(s), hindered cycloaliphatic vinyl monomer(s), hindered aliphatic vinylidene monomer (s) or hindered cycloaliphatic vinylidene monomer(s) means that the monomer distribution in the interpolymer can be described by a 'Bernoulli statistical model' or by a 'first or second order Markovian statistical model', as described by J. C. Randall on pages 71 to 78 of 'Polymer Sequence Determination, Carbon-13 NMR Method' published in 1977 by Academic Press, New York.

Preferably, a substantially random interpolymer comprising at least one α-olefin having 2 to 20 carbon atoms and an aromatic vinyl or vinylidene monomer contains blocks of more than 3 aromatic vinyl or vinylidene monomer units (e.g. styrene monomer units of 4 or more repeat units derived from styrene) in an amount of not more than 15% of the total amount of aromatic vinyl or vinylidene monomer units. More preferably, this interpolymer cannot be characterized by a high degree of isotacticity or syndiotacticity. This means that in the $^{13}C$ NMR spectrum of the substantially random interpolymer, the peak area corresponding to main chain methylene and methine carbons that exhibit either a meso diad sequence or a racemic diad sequence should not exceed 75% of the total peak area for main chain methylene and methine carbons.

Interpolymers suitable for use in the present invention include interpolymers obtained by polymerizing at least one α-olefin with at least one aromatic vinyl or vinylidene monomer and/or at least one hindered aliphatic or cycloaliphatic vinyl or vinylidene monomer, although there is no limitation thereto.

Examples of preferable α-olefins are α-olefins having 2 to 20 carbon atoms, preferably 2 to 12, more preferably 2 to 8. Out of these, ethylene, propylene, 1-butene, 4-methyl-1-pentene, 1-hexene, and 1-octene are particularly preferable. These α-olefins do not contain aromatic groups.

Examples of aromatic vinyl or vinylidene monomers suitable for use in the manufacture of an interpolymer that can be used in the present invention include monomers represented by the following formula.

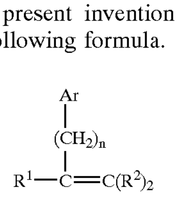

In this formula, $R^1$ is an atom or group selected from the group consisting of a hydrogen atom and alkyl groups having 1 to 4 carbon atoms, and is preferably a hydrogen atom or a methyl group.

Each $R^2$ is independently an atom or group selected from the group consisting of a hydrogen atom and alkyl groups having 1 to 4 carbon atoms, and is preferably a hydrogen atom or a methyl group.

Ar is a phenyl group, or a phenyl group substituted with 1 to 5 substituents selected from the group consisting of halogen atoms, alkyl groups having 1 to 4 carbon atoms, and haloalkyl groups having 1 to 4 carbon atoms.

n is an integer from 0 to 4, preferably 0 to 2, most preferably 0.

Specific examples of aromatic monovinyl or monovinylidene monomers are styrene, vinyltoluene, α-methylstyrene, t-butylstyrene, chlorostyrene, and so on, with all isomers thereof being included. Particularly preferable aromatic monovinyl or monovinylidene monomers are styrene, and lower alkyl- and halogen-substituted derivatives thereof. Preferable monomers are styrene, α-methylstyrene, lower ($C_{1-4}$) alkyl- and phenyl ring-substituted derivatives of styrene, for example ortho-, meta- and para-methylstyrene, ring-substituted styrene, and para-vinyltoluene, and also mixtures thereof. A particularly preferable aromatic monovinyl or monovinylidene monomer is styrene.

The previously mentioned term 'hindered aliphatic or cycloaliphatic vinyl or vinylidene compounds' means vinyl or vinylidene monomers capable of undergoing addition polymerization corresponding to compounds represented by the following formula.

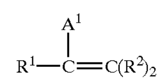

In this formula, $A^1$ is a sterically bulky aliphatic or cycloaliphatic substituent having no more than 20 carbon atoms.

$R^1$ is an atom or group selected from the group consisting of a hydrogen atom and alkyl groups having 1 to 4 carbon atoms, and is preferably a hydrogen atom or a methyl group.

Each $R^2$ is independently an atom or group selected from the group consisting of a hydrogen atom and alkyl groups having 1 to 4 carbon atoms, and is preferably a hydrogen atom or a methyl group.

$R^1$ and $A^1$ may be combined to form a ring system.

'sterically bulky' above means that a monomer having such an aliphatic or cycloaliphatic substituent cannot undergo ordinary addition polymerization at a rate comparable with that of ethylene polymerization using a standard Ziegler-Natta catalyst.

Preferable hindered aliphatic or cycloaliphatic vinyl or vinylidene compounds are monomers that have an ethylenic unsaturated bond and have one carbon atom that has been subjected to tertiary or quaternary substitution. Examples of the substituents are cycloaliphatic groups such as cyclohexyl, cyclohexenyl and cyclooctenyl, and cyclic alkyl- and aryl-substituted derivatives thereof. The most preferable hindered aliphatic or cycloaliphatic vinyl or vinylidene compounds are various isomeric vinyl-substituted derivatives of cyclohexane and substituted cyclohexanes, and 5-ethylidene-2-norbornene. Particularly preferable are 1-, 3- and 4-vinylcyclohexene.

An interpolymer used in the present invention obtained by polymerizing at least one α-olefin, and at least one aromatic vinyl or vinylidene monomer and/or at least one hindered aliphatic or cycloaliphatic vinyl or vinylidene monomer is a substantially random copolymer. Such interpolymers generally contain 1 to 99 mol %, preferably 5 to 65 mol %, more preferably 5 to 50 mol %, of at least one aromatic vinyl or vinylidene monomer and/or at least one hindered aliphatic or cycloaliphatic vinyl or vinylidene monomer, and 1 to 99 mol %, preferably 35 to 95 mol %, more preferably 50 to 95 mol %, of at least one α-olefin having 2 to 20 carbon atoms.

The number average molecular weight (Mn) of the interpolymer is generally at least 10,000, preferably 20,000 to 1,000,000, more preferably 50,000 to 500,000.

Incidentally, during manufacture of such a substantially random interpolymer, a certain amount of an atactic aromatic vinyl or vinylidene homopolymer may be produced through homopolymerization of an aromatic vinyl or vinylidene monomer under heating. The presence of an aromatic vinyl or vinylidene homopolymer is in general undesirable in terms of the object of the present invention, and cannot be ignored. If desired, such an aromatic vinyl or vinylidene homopolymer can be separated from the interpolymer through an extraction technique in which, for example, either the interpolymer or the aromatic vinyl or vinylidene homopolymer is selectively precipitated from the solution using a nonsolvent therefor. In view of the object of the present invention, it is desirable for the amount present of an aromatic vinyl or vinylidene homopolymer to be not more than 20 wt %, preferably not more than 15 wt %, of the total amount of the interpolymer.

A substantially random interpolymer can be manufactured as described in U.S. patent application Ser. No. 07/545,403 filed on Jul. 3, 1990 by James C. Stevens et al. (corresponding to EP-A-0,416,815), and U.S. patent application Ser. No. 08/469,828, which was filed on Jun. 6, 1995 and was approved (U.S. Pat. No. 5,703,187). All of the disclosures in these U.S. patent applications are incorporated herein. Preferable operating conditions in the polymerization reaction of these U.S. patent applications are a pressure of atmospheric pressure to 3,000 atmospheres, and a temperature of −30 to 200° C. If polymerization and removal of unreacted monomers are carried out at a temperature higher than the automatic polymerization temperature of the respective monomers, then a certain amount of homopolymer polymerization products may be produced through free radical polymerization.

Examples of preferable catalysts and methods for manufacturing substantially random interpolymers that can be used in the present invention are disclosed in U.S. patent application Ser. No. 07/545,403, which was filed on Jul. 3, 1990 and corresponds to EP-A-416,815; U.S. patent application Ser. No. 07/702,475, which was filed on May 20, 1991 and corresponds to EP-A-514,828; U.S. patent application Ser. No. 07/876,268, which was filed on May 1, 1992 and corresponds to EP-A-520,732; U.S. patent application Ser. No. 08/241,523, which was filed on May 12, 1994 (U.S. Pat. No. 5,470,993); and U.S. Pat. Nos. 5,055,438, 5,057,475, 5,096,867, 5,064,802, 5,132,380, 5,189,192, 5,321,106, 5,347,024, 5,350,723, 5,374,696, 5,399,635, and 5,556,928. All of the disclosures therein are incorporated herein.

Substantially random α-olefin/aromatic vinyl or vinylidene interpolymers that can be used in the present invention can also be manufactured using the method described in WO95/32095 by John C. Bradfute et al. (W. R. Grace & Co.), the method described in WO94/00500 by R. B. Pannell (Exxon Chemical Patents, Inc.), and the method described on page 25 in 'Plastics Technology' (September 1992); all of the disclosures therein are incorporated herein as well.

Moreover, substantially random interpolymers comprising at least one α-olefin/aromatic vinyl/aromatic vinyl/α-olefin tetrad disclosed in U.S. patent application Ser. No. 08/708,809 filed on Sep. 4, 1996 by Francis J. Timmers et al. (U.S. Pat. No. 5,879,149) are also preferable. These interpolymers have additional signals having at least three times the intensity of a peak to peak noise ratio. These signals appear in the chemical shift ranges 43.75–44.25 ppm and 38.0–38.5 ppm. In particular, peaks are observed at 44.1, 43.9 and 38.2 ppm. Proton test NMR experiments show that the signals in the 43.75–44.25 ppm chemical shift range are methine carbons, and the signals in the 38.0–38.5 ppm range are methylene carbons.

Pseudo-random interpolymers comprising an aliphatic α-olefin and an aromatic monovinyl or monovinylidene compound that can be used in the present invention are disclosed in U.S. patent application Ser. No. 545403 filed on Jul. 3, 1990 (corresponding to European Patent Application Laid-open No. 0416815).

These interpolymers can be manufactured by carrying out polymerization at a temperature in a range of −30 to 250° C. in the presence of a catalyst represented by the following formula, and preferably a cocatalyst if desired.

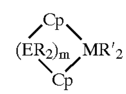

Here, each Cp is independently a substituted cyclopentadienyl group that is π-bonded to M, E is a carbon or silicon atom, M is a group IV metal, preferably Zr or Hf, most preferably Zr, each R is independently a hydrogen atom, or a hydrocarbyl, silahydrocarbyl or hydrocarbylsilyl group having not more than 30, preferably 1 to 20, more preferably 1 to 10, carbon or silicon atoms, and each R' is independently a hydrogen atom, a halogen atom, or a hydrocarbyl, hydrocarbyloxy, silahydrocarbyl or hydrocarbylsilyl group having not more than 30, preferably 1 to 20, more preferably 1 to 10, carbon or silicon atoms, or the two R' groups together form a $C_{1-10}$ hydrocarbyl-substituted 1,3-butadiene, and m is 1 or 2. Examples of particularly preferable substituted cyclopentadienyl group are groups represented by the following formula.

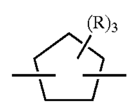

Here, each R is independently a hydrogen atom, or a hydrocarbyl, silahydrocarbyl or hydrocarbylsilyl group having not more than 30, preferably 1 to 20, more preferably 1 to 10, carbon or silicon atoms, or the two R groups together form a bivalent derivative thereof. Preferably, each R is independently hydrogen, methyl, ethyl, propyl, butyl, pentyl, hexyl, benzyl or phenyl (wherein in the case that isomers exist all of the isomers are included), or (if possible) the two R groups together form a fused ring system such as indenyl, fluorenyl, tetrahydroindenyl, tetrahydrofluorenyl or octahydrofluorenyl.

Specific examples of particularly preferable catalysts include racemic (dimethylsilanediyl)bis(2-methyl-4-phenylindenyl)zirconium dichloride, racemic (dimethylsilanediyl)bis(2-methyl-4-phenylindenyl) zirconium 1,4-diphenyl-1,3-butadiene, racemic (dimethylsilanediyl)bis(2-methyl-4-phenylindenyl) zirconium di-$C_{1-4}$-alkyls, racemic (dimethylsilanediyl)bis (2-methyl-4-phenylindenyl)zirconium di-$C_{1-4}$-alkoxides, and combinations thereof.

Moreover, specific examples of titanium-based constrained geometry catalysts include [N-(1,1-dimethylethyl)-1,1-dimethyl-1-[(1,2,3,4,5-η)-1,5,6,7-tetrahydro-s-indacen- 1-yl]silaneaminato(2-)-N] titanium dimethyl, (1-indenyl)(t-butylamido)dimethylsilane titanium dimethyl, ((3-t-butyl)(1,2,3,4,5-η)-1-indenyl)(t-butylamido)dimethylsilane titanium dimethyl, ((3-isopropyl)(1,2,3,4,5-η)-1-indenyl)(t-butylamido)dimethylsilane titanium dimethyl, and combinations thereof.

Others method of manufacturing interpolymers that can be used in the present invention are described by Longo and Grassi (Makromol. Chem., Vol. 191, p2387–2396 (1990)) and D'Aniello et al. (Journal of Applied Polymer Science, Vol. 58, p1701–1706 (1995)); here, an ethylene-styrene copolymer is prepared using a methylaluminoxane (MAO) and cyclopentadienyl titanium trichloride ($CpTiCl_3$) catalyst system. Moreover, Xu and Lin (Polymer Preprints, Am. Chem. Soc., Div. Polym. Chem., Vol. 35, p686–687 (1994)) have prepared a random copolymer between styrene and propylene using an $MgCl_2/TiCl_4/NdCl_3/Al(iBu)_3$ catalyst. Furthermore, Lu et al. (Journal of Applied Polymer Science, Vol. 53, p1453–1460 (1994)) have reported on a copolymer between ethylene and styrene using a $TiCl_4/NdCl_3/MgCl_2/Al(Et)_3$ catalyst.

Sernets and Mulhaupt (Macromol. Chem. Phys., v. 197, pp. 1071–1083, 1997) describe the effects of the polymerization conditions in the copolymerization of styrene and ethylene using an $Me_2Si(Me_4\ Cp)$ (N-t-butyl)$TiCl_2$/methylaluminoxane Ziegler-Natta catalyst. Ethylene-styrene copolymers manufactured using a bridged metallocene catalyst are described by Arai, Toshiaki and Suzuki (Polymer Preprints, Am. Chem. Soc., Div. Polym. Chem., Vol. 38, p349–350, 1997) and in U.S. Pat. No. 5,652,315 (Mitsui Toatsu Chemicals, Inc.). The manufacture of interpolymers comprising an α-olefin and an aromatic vinyl monomer (e.g. propylene/styrene or butene/styrene) is described in U.S. Pat. No. 5,244,996 (Mitsui Petrochemical Industries, Ltd.) and U.S. Pat. No. 5,652,315 (Mitsui Petrochemical Industries, Ltd.), and is also described in German publication DE19711339A1, U.S. Pat. No. 5,883,213 (Denki Kagaku Kogyo K. K.), and so on. The interpolymer component preparation methods disclosed in the above are incorporated into the present invention as reference documents. The ethylene/styrene random copolymer disclosed by Aria et al. in Polymer Preprints, Vol. 39, No. 1, March 1998 can also be used a component in the present invention.

Examples of suitable catalysts and methods for manufacturing pseudo-random interpolymers that are suitable for use in the present invention are disclosed in the specifications of U.S. patent application Ser. No. 545,403 filed on Jul. 3, 1990 (European Patent Application Laid-open No. 0416815), U.S. patent application Ser. No. 547,718 filed on Jul. 3, 1990 (European Patent Application Laid-open No. 468651), U.S. patent application Ser. No. 702,475 filed on May 20, 1991 (European Patent Application Laid-open No. 514828), U.S. patent application Ser. No. 876,268 filed on May 1, 1992 (European Patent Application Laid-open No. 520732), U.S. patent application Ser. No. 8,003 filed on Jan. 21, 1993 (U.S. Pat. No. 5,374,696), U.S. patent application Ser. No. 82,197 filed on Jun. 24, 1993 (corresponding to WO95/00526), and also U.S. Pat. Nos. 5,055,438, 5,057,475, 5,096,867, 5,064,802, 5,132,380 and 5,189,192; all of these are cited as references for the present invention.

Film for Fastening Cargo During Transportation

For a film for fastening cargo during transportation according to the present invention comprising such interpolymer(s), the percentage strain change 100 hours after applying a load of 3.5 MPa at a temperature of 23° C. is not more than 2.0%, preferably 1.4 to 1.7%, and the percentage strain change 100 hours after applying a load of 0.5 MPa at a temperature of 55° C. is not more than 2.5%, preferably 2.0 to 2.3%. Moreover, the film of the present invention preferably has an elastic modulus at a temperature of 23° C. of not more than 60 MPa, more preferably 10 to 30 MPa, and preferably has an elastic modulus at a temperature of 55° C. of not more than 20 MPa, more preferably 1 to 10 MPa. A film for which the percentage strain changes at temperatures of 23° C. and 55° C. are low as above has excellent ability to hold/fasten products (cargo) during transportation.

A specific method of measuring the elastic modulus and percentage strain changes will be described later in the 'Examples' section.

Preparation of Fastening Film

The fastening film according to the present invention can be formed using a conventional publicly known method, for example using an extruder such as a calender apparatus, a T-die apparatus, or an inflation apparatus. When forming the film, in addition to the interpolymer(s) described above, additives such as antioxidants, ultraviolet absorbers, weather-resistant stabilizers, heat-resistant stabilizers, anti-static agents, fire retardants, pigments, dyes and slipping agents can be mixed in as required within ranges such that the object of the present invention is not impaired.

The film for fastening cargo during transportation according to the present invention exhibits effects of the ability to hold/fasten products during transportation being excellent, and hence products not being damaged during transportation. Moreover, the film has a property of pinholes not being prone to occur in a pinhole resistance test.

EXAMPLES

Following is a description of the present invention through examples; however, the present invention is not limited by these examples whatsoever.

The percentage strain changes for the films obtained in the examples and for commercially sold films were measured in accordance with the following methods.

(1) Using a tensile test (ASTM-4), a load of 3.5 MPa was applied to the film (size: thickness 80 μm, length 64 mm, width, 10 mm) at a temperature of 23° C., the strain after 100 hours was measured, and the percentage change in the strain relative to the initial strain was calculated.

(2) Using a tensile test (ASTM-4), a load of 0.5 MPa was applied to the film (size: thickness 80 μm, length 64 mm, width, 10 mm) at a temperature of 55° C., the strain after 100 hours was measured, and the percentage change in the strain relative to the initial strain was calculated.

(3) Using a tensile test (ASTM-4), the elastic modulus at a temperature of 23° C. was determined.

(4) Using a tensile test (ASTM-4), the elastic modulus at a temperature of 55° C. was determined.

(5) Using a Gelbo flex tester, a 205 mm×180 mm sample was twisted in a cylindrical shape 5000 times by 440° at a speed of 40 times/min, and the number of pinholes in the sample was measured.

The interpolymers used in the examples were as follows.

Interpolymers (1) Ethylene-styrene copolymer (interpolymer) (ESI-2008) Styrene content: 25 wt % MFR (ASTM D 1238, 190° C., 2.16 kg load): 1.0 g/10 min (2) Ethylene-styrene copolymer (interpolymer) (ESI-2408) Styrene content: 30 wt % MFR (ASTM D 1238, 190° C., 2.16 kg load): 1.0 g/10 min Example 1

Using a granulator, 100 parts by weight of the above-mentioned ethylene-styrene copolymer (ESI-2008; made by Dow Chemical Company), 0.1 parts by weight of Irganox 1010 (trade name; phenolic antioxidant made by Ciba Specialty Chemicals), 0.1 parts by weight of Irgafos 168 (trade name; phosphor-based antioxidant made by Ciba Specialty Chemicals), 0.5 parts by weight of DICALITE WF (trade name; anti-blocking agent made by Grefco), and 0.5 parts by weight of Alflow P-10 (trade name; slipping agent made by NOF Corporation) were subjected to melt kneading, and pellets were prepared under the following granulating conditions.

<Granulating Conditions>

Granulator: Kasamatsu 65 mm single-screw extruder
L/D: 28
Mesh: 80/100/80
Screw diameter: 65 mm
Rotational speed of screw: 45 rpm
Extrusion amount: 28 kg/hr
Temperatures of various parts: C1/C2/C3/C4/CH1/CH2/D=160/170/190/190/190/190/190° C.

Next, using an inflation molding machine, an 80 μm-thick film was formed under the following film formation conditions from the pellets obtained as described above.

<Film Formation Conditions>

Molding machine: Inflation
L/D: 26
Screw diameter: 65 mm
Rotational speed of screw: 37 rpm
Extrusion amount: 36 kg/hr
Die diameter: 100 mm
Temperatures of various parts: C1/C2/A/D1/D2=180/180/190/190/190° C.

Next, the elastic modulus, percentage strain change and pinhole resistance for the film obtained were determined following the methods described earlier. The results are shown in Table 1.

Example 2

The same was done as in Example 1, except that the above-mentioned ethylene-styrene copolymer (ESI-2408; made by Dow Chemical Company) was used instead of the ethylene-styrene copolymer (ESI-2008). The results are shown in Table 1.

Comparative Example 1

The same was done as in Example 1, except that a commercially sold 80 μm-thick EVA film was used instead of the film obtained in Example 1. The results are shown in Table 1.

Comparative Example 2

The same was done as in Example 1, except that a commercially sold 80 μm-thick urethane resin film was used instead of the film obtained in Example 1. The results are shown in Table 1.

TABLE 1

| | | Example 1 | Example 2 | Comparative Example 1 | Comparative Example 2 |
|---|---|---|---|---|---|
| Percentage strain change (%) | 23° C. | 1.6 | 1.5 | 2.2 | 2.1 |
| | 55° C. | 2.3 | 2.1 | 2.8 | 3.9 |

TABLE 1-continued

| | | Example 1 | Example 2 | Comparative Example 1 | Comparative Example 2 |
|---|---|---|---|---|---|
| Elastic modulus (MPa) | 23° C. | 48 | 20 | 80 | 62 |
| | 55° C. | 12 | 6 | 27 | 25 |
| Pinhole resistance (number of pinholes) | | 0 | 0 | 10 | 5 |

The following can be seen from Table 1. With Comparative Example 1 and Comparative Example 2, the percentage strain change obtained at a temperature of 23° C. exceeded 2.0%, and the percentage strain change obtained at a temperature of 55° C. exceeded 2.5%. If the percentage strain change is high in this way, then there may be a lack of ability to hold/fasten products (cargo) during transportation. Moreover, with Comparative Example 1 and Comparative Example 2, the elastic modulus (at 23° C. and at 55° C.) was high, showing that the film was rigid and would be hard to fit to a product. Moreover, in the pinhole resistance tests, with Comparative Example 1 and Comparative Example 2, pinholes were detected. With such a film, the film will be prone to tearing starting from a pinhole. On the other hand, with Example 1 and Example 2, the percentage strain change obtained at a temperature of 23° C. was not more than 2.0%, and the percentage strain change obtained at a temperature of 55° C. was not more than 2.5%. Moreover, the elastic modulus at 23° C. was not more than 60 MPa, and the elastic modulus at 55° C. was not more than 20 MPa. For a film that has a low percentage strain change and elastic modulus and has excellent pinhole resistance, the ability to hold/fasten products during transportation is excellent.

What is claimed is:

1. A method for fastening cargo using a film comprising fastening or holding the cargo with a film having a percentage strain change 100 hours after applying a load of 3.5 MPa at a temperature of 23° C. that is not more than 2.0%, and a percentage strain change 100 hours after applying a load of 0.5 MPa at a temperature of 55° C. that is not more than 2.5%.

2. The method for fastening cargo according to claim 1, wherein the elastic modulus of the film at a temperature of 23° C. is not more than 60 MPa, and the elastic modulus of the film at a temperature of 55° C. is not more than 20 MPa.

3. The method for fastening cargo according to claim 1, wherein the film comprises at least one substantially random interpolymer comprising:

(1) 1 to 99 mol % of polymer units derived from
  - (a) at least one aromatic vinyl or vinylidene monomer, or
  - (b) at least one hindered aliphatic or cycloaliphatic vinyl or vinylidene monomer, or
  - (c) a combination of at least one aromatic vinyl or vinylidene monomer, and at least one hindered aliphatic or cycloaliphatic vinyl or vinylidene monomer, and (2) 1 to 99 mol % of polymer units derived from at least one α-olefin having 2 to 20 carbon atoms.

4. The method for fastening cargo according to claim 3, wherein said interpolymer is a substantially random interpolymer comprising 5 to 65 mol % of polymer units derived from at least one aromatic vinyl or vinylidene monomer, and 35 to 95 mol % of polymer units derived from at least one α-olefin having 2 to 20 carbon atoms.

5. The method for fastening cargo according to claim 3, wherein said interpolymer is a substantially random interpolymer comprising 5 to 65 mol % of polymer units derived from styrene, and 35 to 95 mol % of polymer units derived from at least one α-olefin having 2 to 10 carbon atoms.

6. The method for fastening cargo according to claim 3, wherein said interpolymer is a pseudo-random interpolymer comprising 5 to 50 mol % of polymer units derived from at least one aromatic vinyl or vinylidene monomer, and 50 to 95 mol % of polymer units derived from at least one α-olefin having 2 to 20 carbon atoms.

7. The method for fastening cargo according to claim 3, wherein said interpolymer is a pseudo-random interpolymer comprising 5 to 50 mol % of polymer units derived from styrene, and 50 to 95 mol % of polymer units derived from at least one α-olefin having 2 to 10 carbon atoms.

* * * * *